US012053977B2

(12) United States Patent
Oguchi et al.

(10) Patent No.: US 12,053,977 B2
(45) Date of Patent: Aug. 6, 2024

(54) PRINTER AND BLADE UNIT

(71) Applicant: FUJITSU COMPONENT LIMITED, Tokyo (JP)

(72) Inventors: Tatsuya Oguchi, Tokyo (JP); Yuji Yada, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 0 days.

(21) Appl. No.: 18/447,670

(22) Filed: Aug. 10, 2023

(65) Prior Publication Data

US 2023/0382138 A1 Nov. 30, 2023

Related U.S. Application Data

(63) Continuation of application No. 17/656,959, filed on Mar. 29, 2022, now Pat. No. 11,760,114.

(30) Foreign Application Priority Data

Apr. 1, 2021 (JP) ................................ 2021-062803

(51) Int. Cl.

| | |
|---|---|
| ***B41J 11/70*** | (2006.01) |
| ***B26D 1/08*** | (2006.01) |
| ***B26D 5/08*** | (2006.01) |
| ***B26D 7/26*** | (2006.01) |
| ***B41J 29/02*** | (2006.01) |
| *B26D 7/00* | (2006.01) |
| *B41J 11/04* | (2006.01) |
| *B41J 15/00* | (2006.01) |

(52) U.S. Cl.

CPC ............... *B41J 11/70* (2013.01); *B26D 1/085* (2013.01); *B26D 5/083* (2013.01); *B26D 7/26* (2013.01); *B26D 7/2614* (2013.01); *B41J 29/02* (2013.01); *B26D 2007/005* (2013.01); *B41J 11/04* (2013.01); *B41J 15/00* (2013.01)

(58) Field of Classification Search

CPC ... B41J 11/70; B41J 29/02; B41J 11/04; B41J 15/00; B26D 1/085; B26D 5/083; B26D 7/26; B26D 7/2614; B26D 2007/005

See application file for complete search history.

(56) References Cited

U.S. PATENT DOCUMENTS 5,974,930 A * 11/1999 Longrod ................ B26D 1/085 235/31 R 7,392,731 B2 * 7/2008 Nonaka ................ B26D 1/0006 400/621

2004/0057771 A1 3/2004 Yamada et al.

(Continued)

FOREIGN PATENT DOCUMENTS

| | | |
|---|---|---|
| EP | 2062703 | 5/2009 |
| JP | 2004-090255 | 3/2004 |

(Continued)

*Primary Examiner* — Yaovi M Ameh

(74) *Attorney, Agent, or Firm* — IPUSA, PLLC

(57) ABSTRACT

A printer configured to cut recording paper with a fixed blade and a movable blade has a blade unit including the movable blade and a slider to which the movable blade is attachable, and the slider includes: a contact part configured to contact the movable blade; a flexible part formed thinner than the contact part; and a first protrusion provided on the flexible part and configured to engage with a first opening provided in the movable blade.

7 Claims, 9 Drawing Sheets

(56) References Cited

U.S. PATENT DOCUMENTS

| | | | | |
|---|---|---|---|---|
| 2005/0281606 | A1 | 12/2005 | Koyama et al. | |
| 2007/0265651 | A1* | 11/2007 | Yi | A61B 17/3215 301/51 |
| 2010/0086341 | A1* | 4/2010 | Yokoyama | B26D 1/085 400/621 |
| 2010/0188470 | A1 | 7/2010 | Tsuchiya et al. | |
| 2015/0061206 | A1 | 3/2015 | Takabatake et al. | |
| 2015/0246562 | A1 | 9/2015 | Takabatake et al. | |
| 2016/0052307 | A1 | 2/2016 | Nomura et al. | |

FOREIGN PATENT DOCUMENTS

| | | |
|---|---|---|
| JP | 2004-106489 | 4/2004 |
| JP | 2010-173129 | 8/2010 |
| JP | 2015-044354 | 3/2015 |
| JP | 2015-044368 | 3/2015 |

* cited by examiner

PRINTER AND BLADE UNIT

CROSS-REFERENCE TO RELATED APPLICATION

The present application is a continuation application of U.S. patent application Ser. No. 17/656,959 filed on Mar. 29, 2022, which is based on and claims priority under 35 U.S.C. § 119 to Japanese Patent Application No. 2021-062803, filed on Apr. 1, 2021, the entire contents of which are incorporated herein by reference.

TECHNICAL FIELD

A certain aspect of the embodiments is related to a printer and a blade unit.

BACKGROUND

Printers that issue receipts and the like are used in a wide range of applications such as store registers, automated teller machines and cash dispensers in banks, and so forth. Some of such printers print on recording paper using a print head or the like while transporting the recording paper, and cut the recording paper with a cutter.

There is a printer that has a main body of the printer and a cover that is supported by the main body in a rotatable fashion, and roll-shaped recording paper can be set in the main body by opening the cover. A print head is provided in the main body, and a platen roller is provided in the cover, and, when the cover is closed, the recording paper is sandwiched between the print head and the platen roller. With the recording paper sandwiched between the print head and the platen roller, printing is performed on the recording paper.

A printer that cuts recording paper with a cutter including a movable blade and a fixed blade can cut the recording paper by moving the movable blade towards the fixed blade while the recording paper is sandwiched between the movable blade and the fixed blade.

RELATED ART

[Patent Document 1] Japanese Unexamined Patent Application Publication No. 2004-106489

[Patent Document 2] Japanese Unexamined Patent Application Publication No. 2004-090255

[Patent Document 3] Japanese Patent Publication No. 6293439

[Patent Document 4] Japanese Patent Publication No. 5292114

SUMMARY

According to at least one aspect of the herein-contained embodiment, a printer configured to cut recording paper with a fixed blade and a movable blade has a blade unit including the movable blade and a slider to which the movable blade is attachable, and the slider includes: a contact part configured to contact the movable blade; a flexible part formed thinner than the contact part; and a first protrusion provided on the flexible part and configured to engage with a first opening provided in the movable blade.

According to another aspect of the herein-contained embodiment, a blade unit has a movable blade that cuts recording paper with a fixed blade, the blade unit including the movable blade and a slider to which the movable blade is attachable, and the slider includes: a contact part configured to contact the movable blade; a flexible part formed thinner than the contact part; and a first protrusion provided on the flexible part and configured to engage with a first opening provided in the movable blade.

DETAILED DESCRIPTION OF THE INVENTION

Hereinafter, a description will be given of the present embodiment of the present invention with reference to the drawings.

A cutter that has repeated cutting recording paper is likely to be damaged. A damaged cutter cannot cut recording paper, and needs to be replaced. However, replacing the movable blade alone is not easy for the user, and is usually done by a specialist by using special tools. Also, a worn cutter needs to be replaced too.

In the following description, the X direction will refer to the longitudinal direction of the movable blade according to the present embodiment. The Y direction will refer to the lateral direction of the movable blade. The Z direction will refer to the direction that is orthogonal to both the X axis and the Y axis.

The direction in which the arrow points along the X direction will be referred to as the "+X direction," and its opposite direction will be referred to as the "−X direction." The direction in which the arrow points along the Y direction will be referred to as the "+Y direction," and its opposite direction will be referred to as the "−Y direction." The direction in which the arrow points along the Z direction will be referred to as the "+Z direction," and its opposite direction will be referred to as the "−Z direction." The X direction corresponds to the left-right direction.

Figure 1:
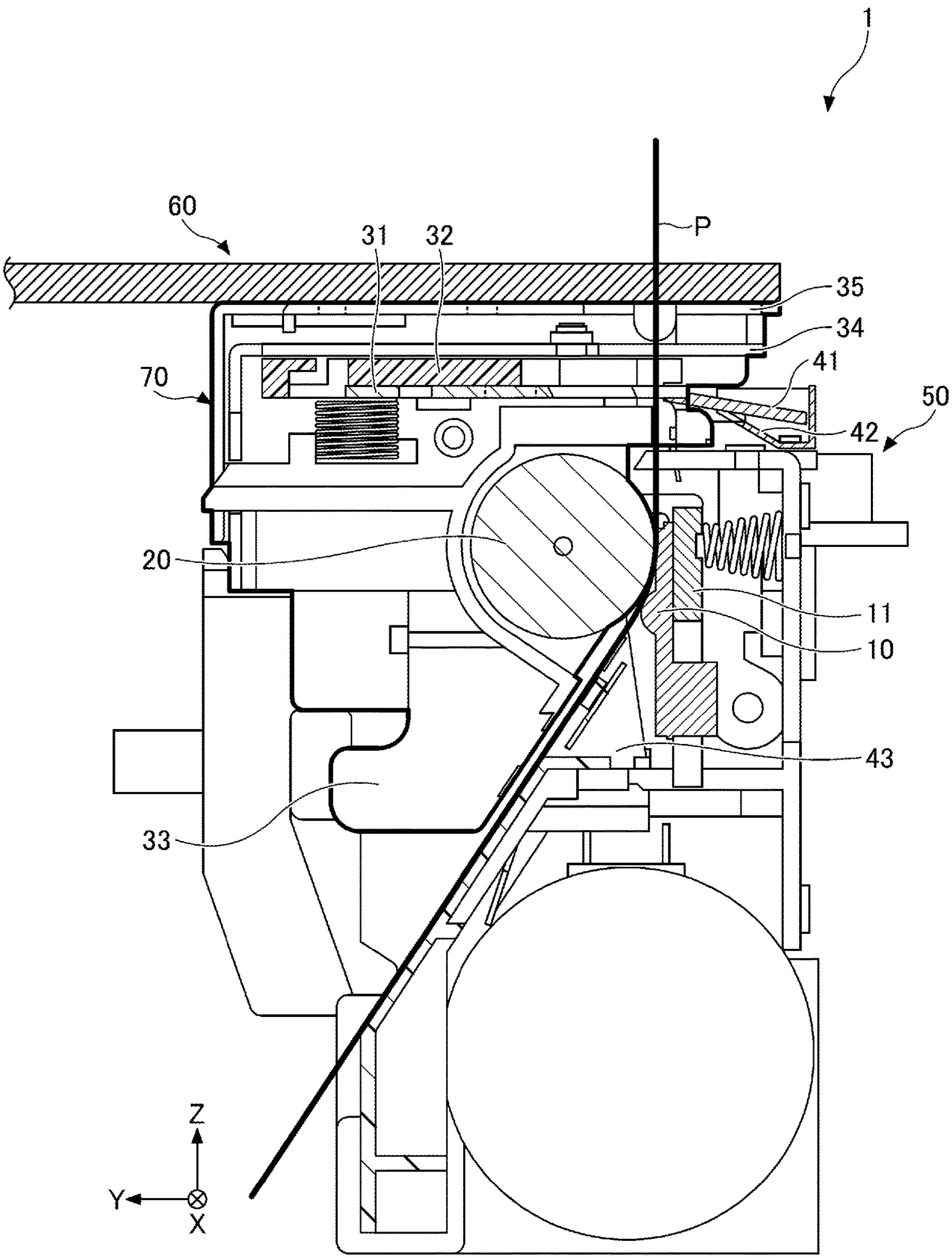
FIG. 1 is a cross-sectional view of a printer according to the present embodiment.
Figure 2:
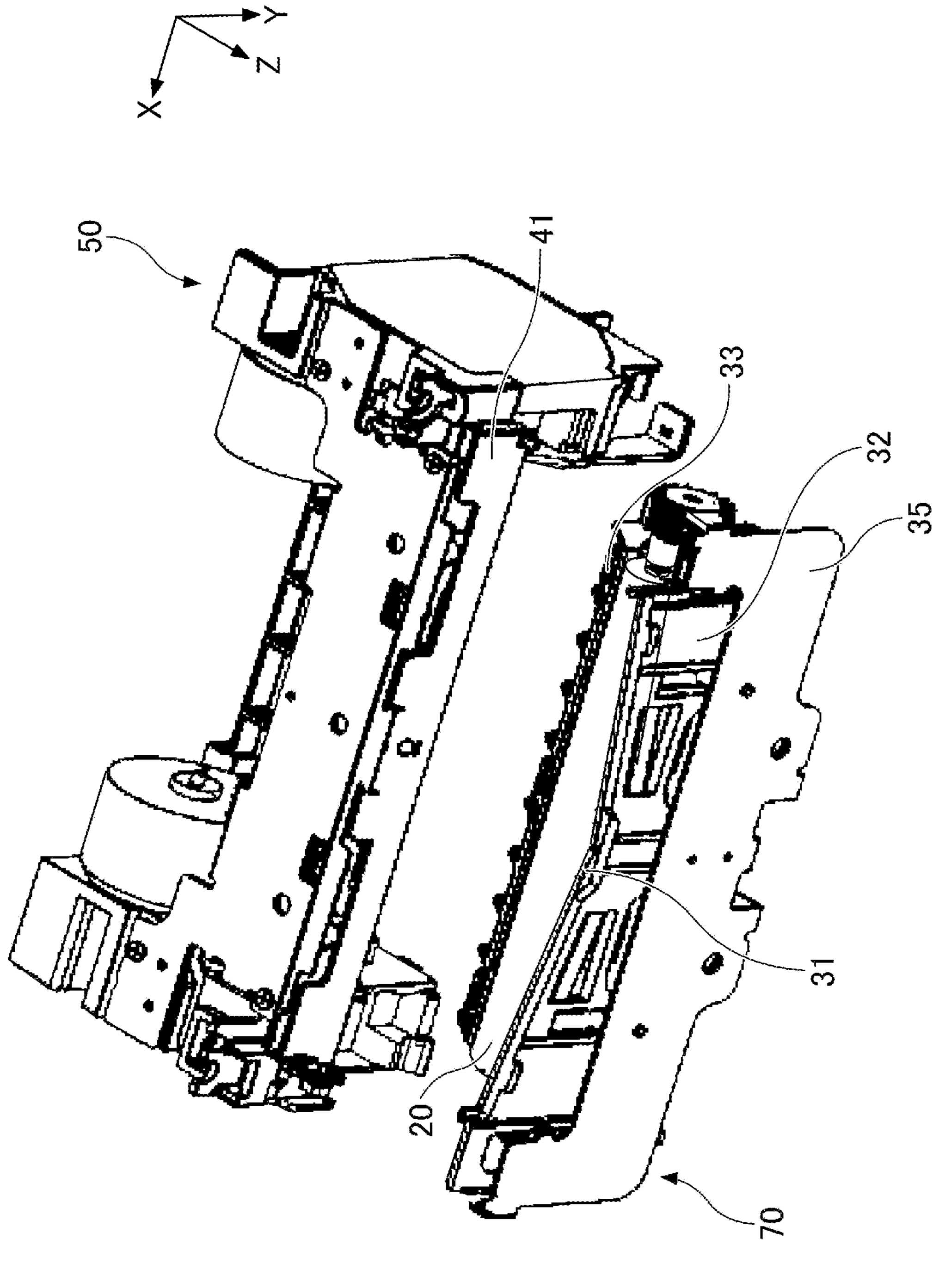
FIG. 2 is a perspective view of the printer.

FIG. 1 is a cross-sectional view of a printer 1 according to the present embodiment, and FIG. 2 is a perspective view of the printer 1. The printer 1 includes a print head 10, such as a print head that prints on recording paper P, which is thermal paper or the like, a platen roller 20 that transports the recording paper P, and a movable blade 31 and a fixed blade 41 that cut the recording paper P.

The printer 1 includes a printer main body (hereinafter "main body") 50, and a blade unit 70 that can be attached to and removed from the main body 50. The main body 50 is attached to a housing (not shown), and the blade unit 70 is attached to a cover 60 in a removable fashion, where the cover 60 is attached to the housing in a rotatable fashion. By opening the cover 60, it is possible to remove the blade unit 70 from the main body 50, and set the recording paper P between the main body 50 and the blade unit 70. Closing the cover 60 places the recording paper P in a state ready for printing using the print head 10. Note that FIG. 1 shows a state in which the cover 60 is closed, while FIG. 2 shows a state in which the blade unit 70 is removed from the main body 50.

The print head 10 and the fixed blade 41 are set in the main body 50, and the platen roller 20, the movable blade 31, and the slider 32 are provided in the blade unit 70.

The movable blade 31 and the fixed blade 41 in FIG. 1 constitute a cutter. The movable blade 31 moves in the −Y direction with the slider 32.

The fixed blade 41 is provided over the spring 42, and is preloaded by the spring 42 in the +Z direction, towards the movable blade 31.

The recording paper P is cut as the movable blade 31 passes over the fixed blade 41. A recording paper guide 43 that forms the transport path and guides the recording paper is set on the printing surface side, upstream of the print head 10 of the transport path of the recording paper P. A heat sink 11 for discharging the heat generated in the print head 10 is provided on the rear surface of the print head 10.

Figure 3:
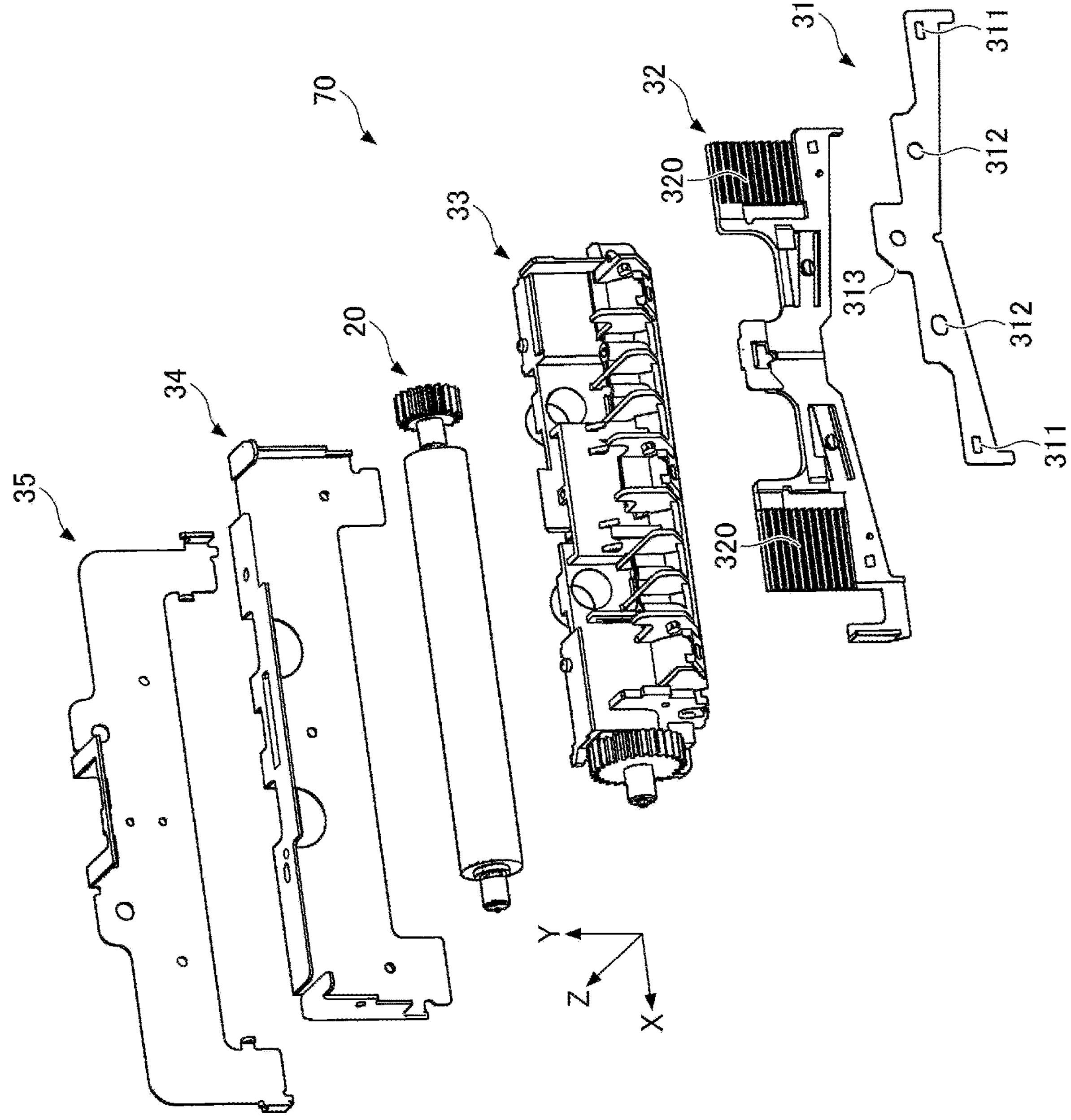
FIG. 3 is an exploded view of a blade unit.

FIG. 3 is an exploded view of the blade unit 70. The blade unit 70 includes the movable blade 31, the slider 32, a frame 33, the platen roller 20, a reinforcing metal fitting 34, and a mounting plate 35.

The movable blade 31 is made of a material such as metal, and the blade portion is formed V-shaped. Furthermore, second openings 311 are provided near both ends of the movable blade 31, and first openings 312 are provided nearer the center than both end parts.

The second openings 311 are throughholes having a substantially rectangular shape in plan view, and the first openings 312 are throughholes having a substantially circular shape in plan view. However, the shape of each opening is by no means limited to the above, and the second openings 311 and the first openings 312 may be both throughholes having a substantially circular shape or a substantially rectangular shape, or throughholes having a substantially elliptical shape or a long hole shape in plan view.

A notch 313 is provided on the opposite side of the movable blade 31, near the center of the blade. At least part of the movable blade 31 is formed asymmetrical by the notch 313.

With this printer, the movable blade 31 and the fixed blade 41 may be slightly curved longitudinally so that their convex sides face each other, in order to reduce the contact area between the movable blade 31 and the fixed blade 41 for improved cutting performance. There is a concern that, if the front and the back of the movable blade 31 are mistaken when assembling the movable blade 31 onto the slider 32, the convex sides of the movable blade 31 and the fixed blade 41 might not face each other, and the cutter's cutting performance might decrease. By forming the movable blade 31 at least partially asymmetrical, it is possible to prevent the front and the back of the movable blade 31 from being misassembled onto the slider 32, and preventing the cutter's cutting performance from decreasing.

The slider 32 is made of a resin material or the like. Racks 320 are provided on both left and right sides on the −Z surface of the slider 32, and connected with pinions (not shown) that are connected to the motor that drives the movable blade via a gear or the like. When the motor rotates, the pinions rotate, and this rotation is transmitted to the racks 320 and allows the slider 32 to move in the Y direction.

By moving the slider 32, assembled with the movable blade 31, the movable blade 31 can be moved. The movable blade 31 and the slider 32 are attached to the +Z side of the frame 33, so as to sandwich the movable blade 31 between the slider 32 and the frame 33. Furthermore, the metal fitting 34 and the plate 35 are mounted so as to cover the movable blade 31 and the slider 32. The metal fitting 34 and the plate 35 are made of metal or the like. Furthermore, the platen roller 20 is attached to the frame 33 in a rotatable fashion. Note that FIG. 2 omits the illustration of the metal fitting 34.

(Slider 32)

Figure 4A:
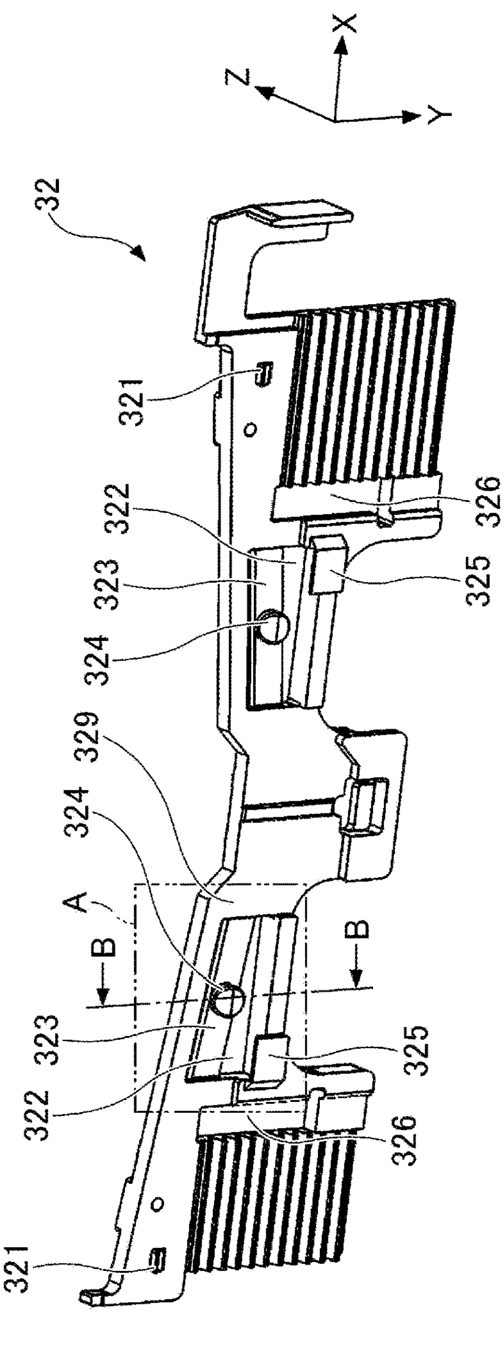
FIG. 4A is a diagram that shows an example of a slider.
Figure 4B:
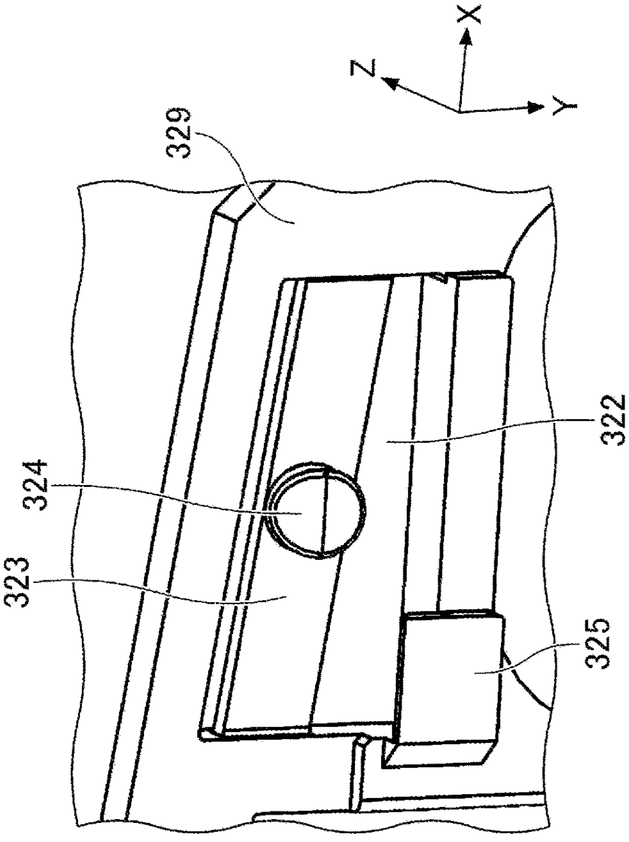
FIG. 4B is another diagram that shows the example of the slider.
Figure 4C:
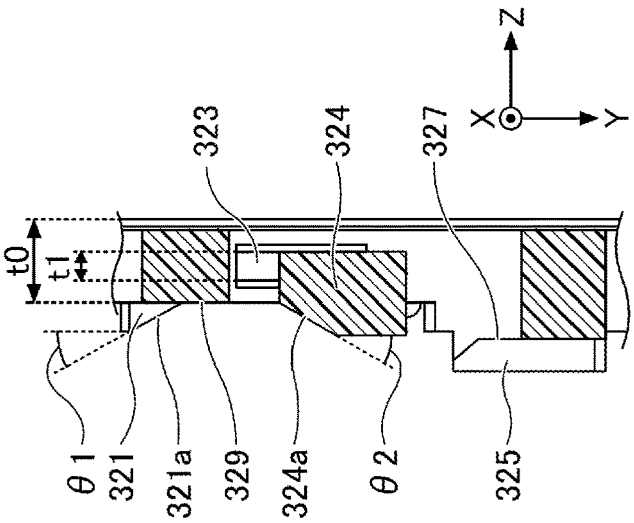
FIG. 4C is another diagram that shows the example of the slider.

FIGS. 4A, 4B and 4C are diagrams that show examples of the slider 32. FIG. 4A is a perspective view seen from the −Z side, FIG. 4B is a partially enlarged view of the region A of FIG. 4A, and FIG. 4C is a cross-sectional view taken along cutting line B-B in FIG. 4A.

In the slider 32 shown in FIGS. 4A, 4B and 4C, second protrusions 321, holes 322, flexible parts 323, first protrusions 324, accommodating parts 325, and guide parts 326 are provided.

The second protrusions 321 are provided near both end parts on the −Z surface of the slider 32, and are protrusions having a substantially rectangular shape in plan view.

The second protrusions 321 are formed in a substantially rectangular shape, in which the lengths of the long side and the short side are equal to the shape of the pair of second openings 311 of the movable blade 31, or formed in a substantially rectangular shape in which the lengths of the long side and the short side are slightly smaller. Formed in this shape, when the movable blade 31 is attached to the slider 32, the pair of second protrusions 321 can engage with the second openings 311 with ease. Furthermore, when removing the movable blade 31 from the slider 32, the second protrusions 321 can be pulled out of the second openings 311 with ease.

In the second protrusions 321 shown in FIG. 4C, a first inclined part 321*a* is formed. The first inclined part 321*a* is inclined by an angle θ1 so that the −Y side is higher and the +Y side is lower.

The holes 322 are provided nearer the center than both end parts of the slider 32. The holes 322 of FIGS. 4A, 4B, and 4C are throughholes that are provided so as not to come into contact with the movable blade 31. In each hole 322, a flexible part 323 with a beam hung over the hole 322 is provided. On the −Z surface of each flexible part 323, a first protrusion 324, having a substantially circular shape in plan view, is provided.

The first protrusions 324 are formed in a substantially circular shape that is substantially equal to the shape of the pair of first openings 312, or formed in a substantially circular shape with a slightly smaller diameter. Formed in such a shape, the pair of second protrusions 321 can engage with the second opening 311 with ease when the movable blade 31 is attached to the slider 32. Furthermore, when removing the movable blade 31 from the slider 32, the second protrusions 321 can be pulled out of the second openings 311 with ease.

In the first protrusion 324 shown in FIG. 4C, a second inclined part 324*a* is provided. The second inclined part 324*a* is inclined by an inclination θ2 so that the +Y side is higher and the −Y side is lower.

The movable blade 31 attached to the slider 32 is in contact with the contact part 329. The thickness t1 of the flexible part 323 is formed thinner than the thickness t0 of the slider 32 in the contact part 329, so that the flexible part 323 is easier to flex than the contact part 329.

To ensure the mechanical strength of the flexible part 323, it is preferable to make the thickness t1 of the flexible part 323 thick. On the other hand, to ensure the flexibility of the flexible part 323, which is required when attaching or removing the movable blade 31 to or from the slider 32, it is preferable to make the thickness t1 thin. For example, when the thickness t0 of the contact part 329 is 1.0 mm, the thickness t1 of the flexible part 323 is made, for example, 0.7 mm or more, and 0.8 mm or less.

By making the beam hung over the hole 322 the flexible part 323, the flexible part 323 flexes more easily. The narrower the width of the beam, the more easily the flexible part 323 flexes, and therefore, for example, the beam's width may be made substantially equal to the width of the first protrusion 324 in the Y direction.

In the outer periphery of each hole 322, an accommodating part 325 is provided so that part of the movable blade 31 mounted on the −Z side of the slider 32 can be accommodated. Each accommodating part 325 is formed in a box shape, and its wall parts corresponding to the inward X direction and the −Y direction are open.

Each accommodating part 325 has an abutting surface 327, to which, when the movable blade 31 is attached to the slider, the surface of the movable blade opposite to the surface facing the slider 32 is abutted. The accommodating part 325 accommodates the movable blade 31 inside, using its open-wall parts, so that the −Z surface of the movable blade 31 can be abutted against the abutting surface 327.

The guide parts 326 are provided in the outward X direction of each accommodating part 325, and are long holes with their longitudinal direction oriented in the Y direction. By inserting projection parts 331, which are provided in the frame 33, into the guide parts 326, the move of the movable blade 31 and the slider 32 in the Y direction with respect to the frame 33 can be guided.

Figure 5A:
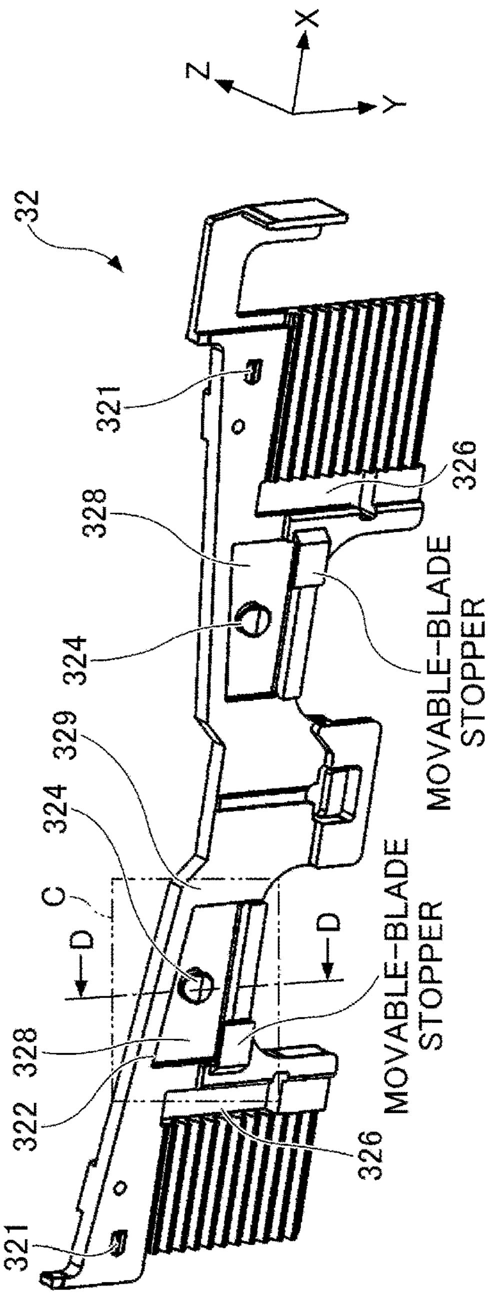
FIG. 5A is a diagram that shows another example of a slider.
Figure 5C:
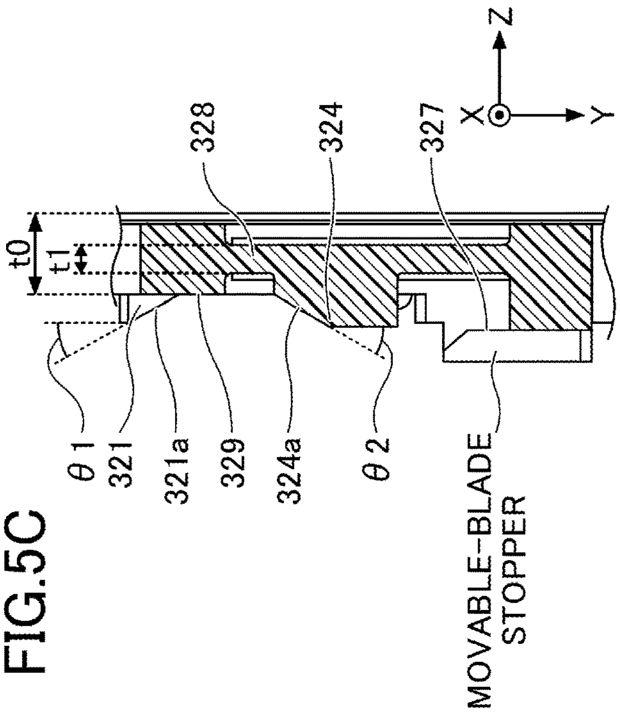
FIG. 5C is another diagram that shows the example of the slider.
Figure 5B:
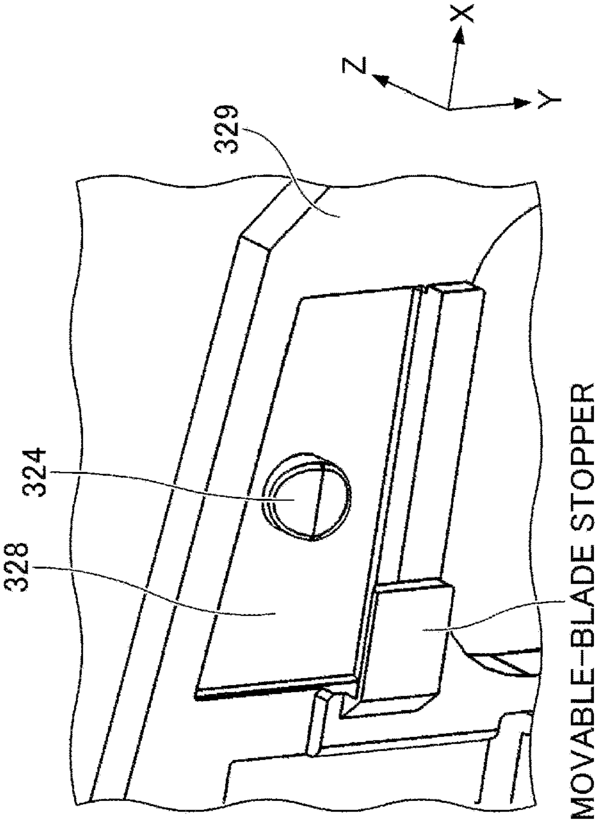
FIG. 5B is another diagram that shows the example of the slider.

Note that, although FIGS. 4A, 4B and 4C each show a structure in which the flexible parts 323 are beams hung over the holes 322, which are throughholes, this is by no means limiting. FIGS. 5A, 5B, and 5C are diagrams that each show another example of the slider 32, where FIG. 5A is a perspective view seen from the −Z side, FIG. 5B is a partially enlarged perspective view of the region C of FIG. 5A, and FIG. 5C is a cross-sectional view taken along cutting line D-D in FIG. 5A.

As shown in FIGS. 5A, 5B, and 5C, recess parts, which are modified examples of the holes 322, are formed on the +Z surface and the −Z surface of the slider 32. Hereinafter, such recess parts will be also treated as "holes." The recess parts are thinner in thickness than the contact parts 329, and these parts serve as the flexible parts 328. The recesses are formed on both surfaces of the slider 32, so that it is possible to prevent the flexible parts 328 from coming into contact with the movable blade 31.

Figure 6A:
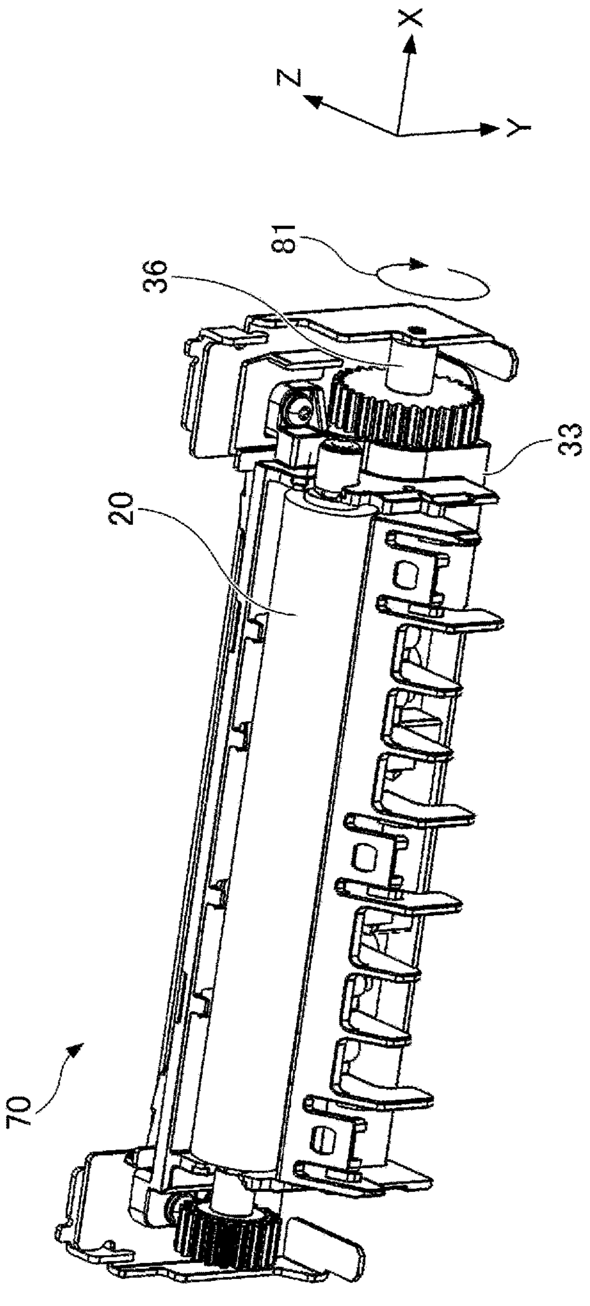
FIG. 6A is a perspective view that shows the move of a movable blade and a slider when the movable blade is attached or removed.
Figure 6B:
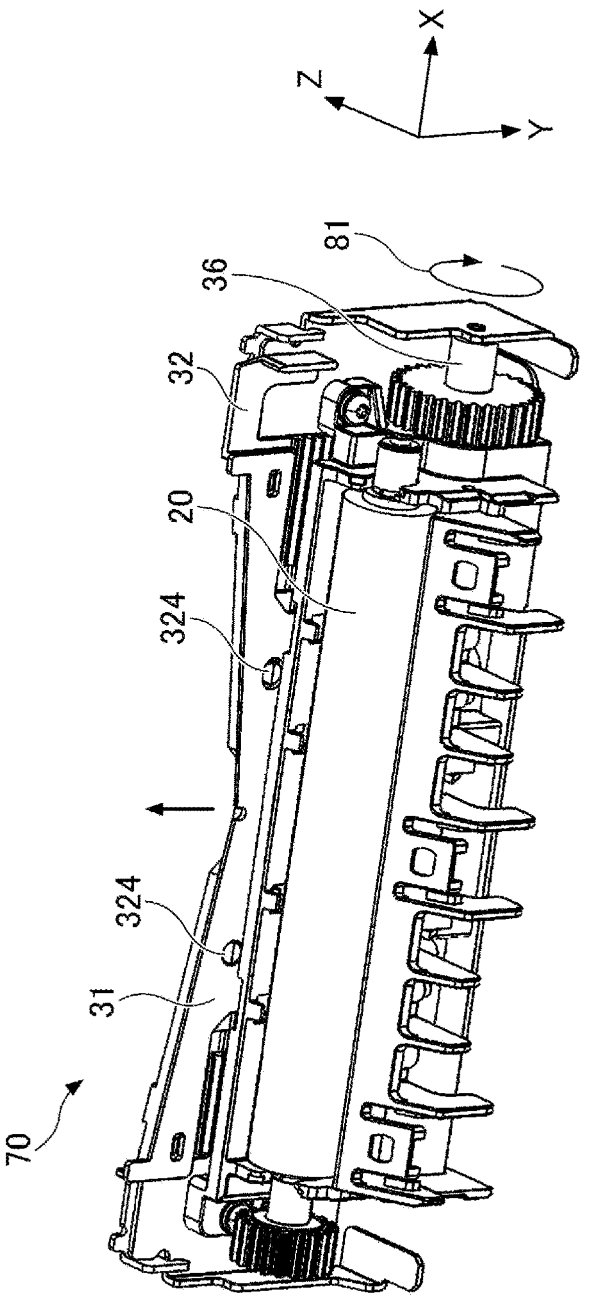
FIG. 6B is another perspective view that shows the move of the movable blade and the slider when the movable blade is attached or removed.
Figure 7A:
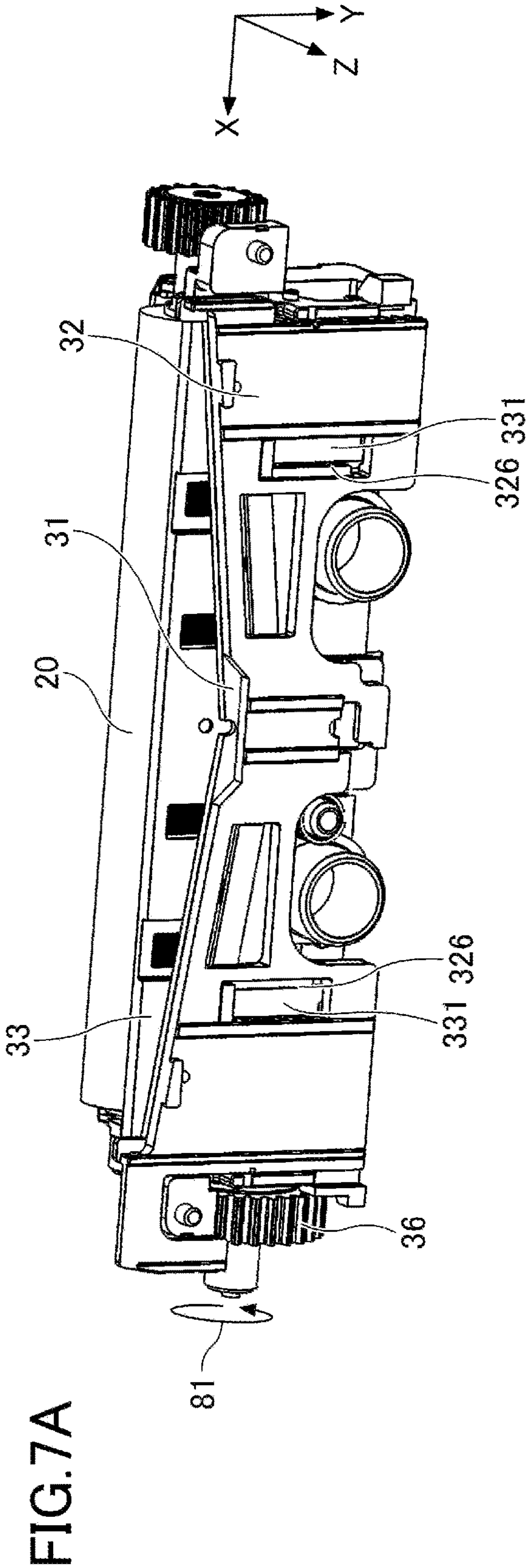
FIG. 7A is a perspective view that shows a blade unit as seen from the rear side.
Figure 7B:
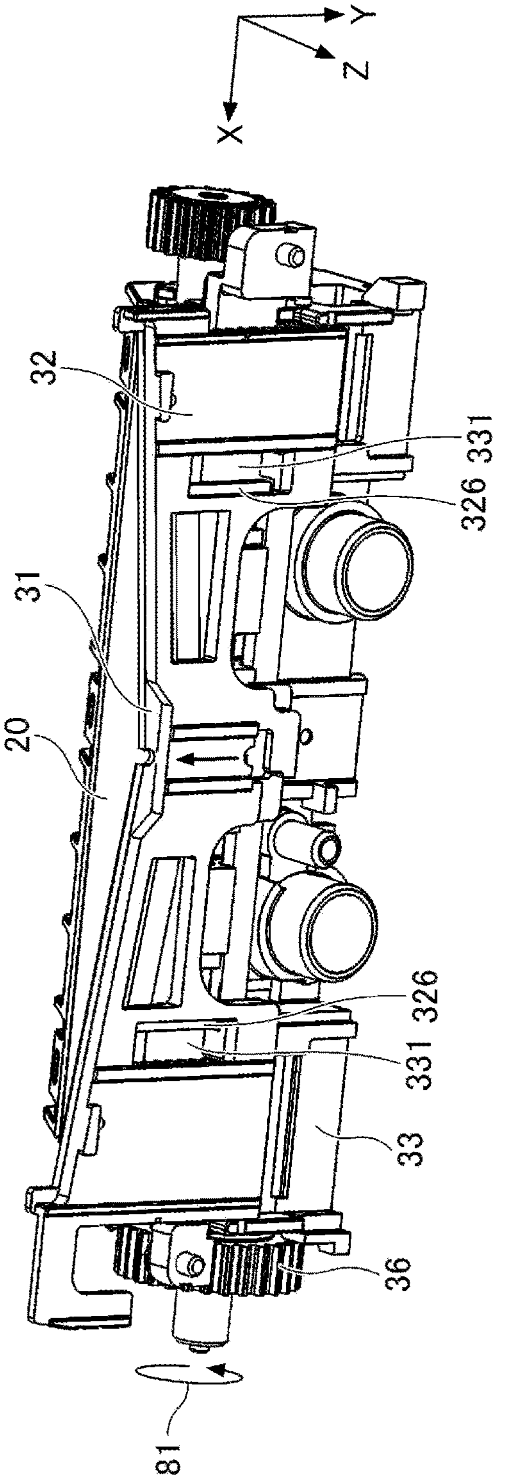
FIG. 7B is another perspective view that shows the blade unit as seen from the rear side.

The attachment and removal of the movable blade 31 to and from the slider 32 in the blade unit 70 will be described below. FIGS. 6A and 6B are perspectives view that show the move of the movable blade 31 and the slider 32 when the slider 32 is attached to or removed from the movable blade 31. FIG. 6A is a perspective view showing a state before the slider 32 is moved, and FIG. 6B is a perspective view showing a state after the slider 32 is moved. FIGS. 7A and 7B provide perspective views of the blade unit seen from the rear side, each showing a state in which the metal fitting 34 and the plate 35 are removed.

Figure 8A:
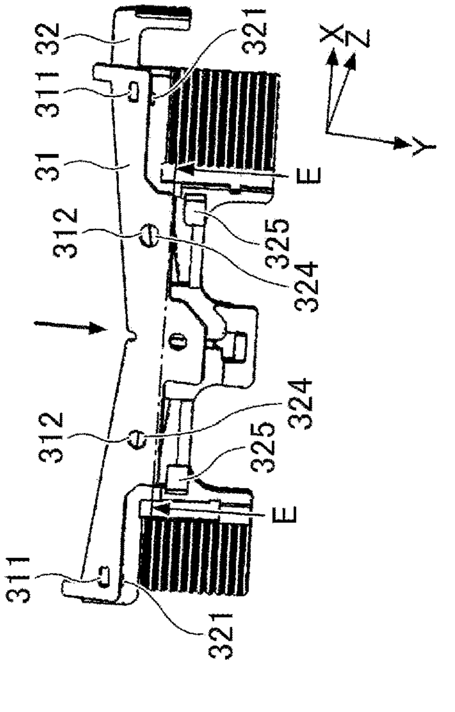
FIG. 8A is a diagram that shows attachment of a movable blade to a slider.
Figure 8B:
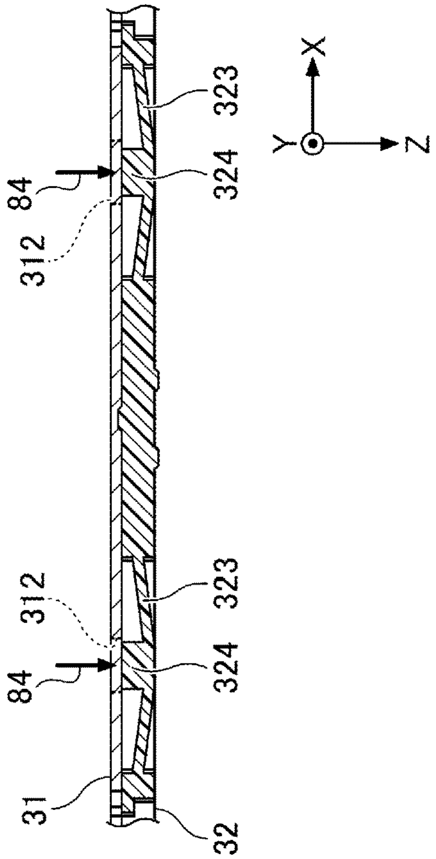
FIG. 8B is another diagram that shows attachment of the movable blade to the slider.
Figure 8C:
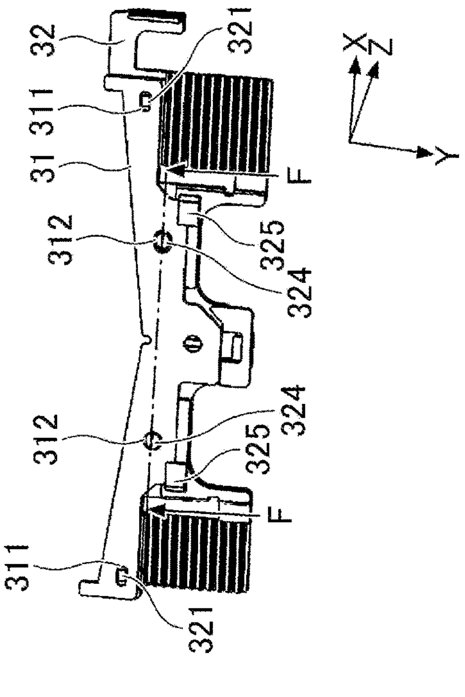
FIG. 8C is another diagram that shows attachment of the movable blade to the slider.
Figure 8D:
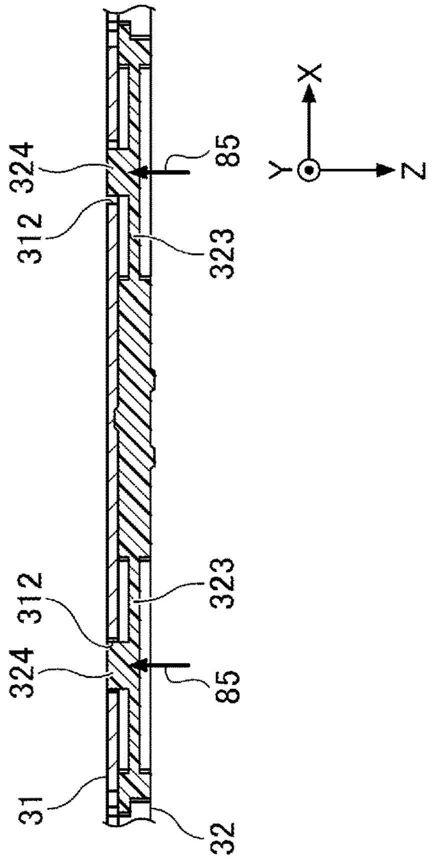
FIG. 8D is another diagram that shows attachment of the movable blade to the slider.

FIGS. 8A, 8B, 8C and 8D provide diagrams showing attachment of the movable blade 31 to the slider 32. FIG. 8A is a diagram showing a state in which the movable blade 31 is being attached, FIG. 8B is a cross-sectional view taken along cutting line E-E in FIG. 8A, FIG. 8C is a diagram showing a state after the movable blade 31 is mounted, and FIG. 8D is a cross-sectional view taken along cutting line F-F in FIG. 8C.

Figure 9A:
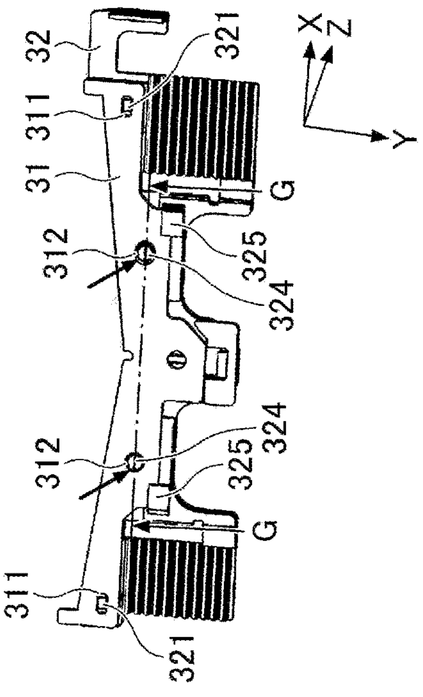
FIG. 9A is a diagram that shows removal of a movable blade from a slider.
Figure 9B:
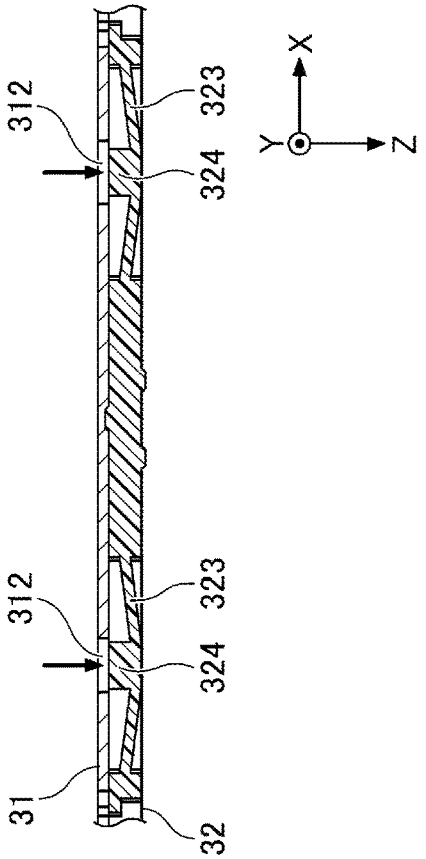
FIG. 9B is another diagram that shows removal of the movable blade from the slider.
Figure 9C:
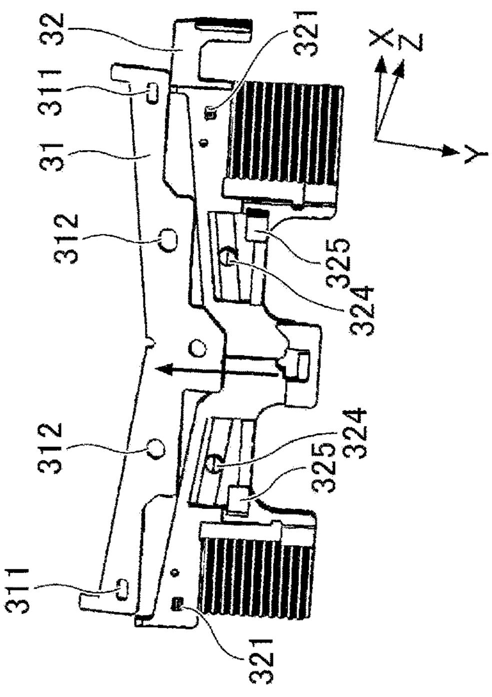
FIG. 9C is another diagram that shows removal of the movable blade from the slider.

FIGS. 9A, 9B and 9C provide diagrams showing removal of the movable blade 31 from the slider 32. FIG. 9A is a diagram showing a state in which the movable blade 31 is being removed, FIG. 9B is a cross-sectional view taken along cutting line G-G in FIG. 9A, and FIG. 9C is a diagram showing a state in which the movable blade 31 is ready for removal.

Referring to FIGS. 6A and 6B, the frame 33 is provided with a gear 36 for driving the movable blade. The gear 36 is driven by a motor provided in the main body 50, and meshes with an intermediate gear (not shown) provided inside the blade unit 70. The intermediate gear meshes with the racks 320 provided in the slider 32. The movable blade 31 and the slider 32 move in the −Y direction in conjunction with the rotation of the gear 36, thereby cutting the recording paper P.

When the gear 36 rotates in the direction of the arrow 81 with the cover 60 open, the movable blade 31 and the slider 32 move in the −Y direction via the intermediate gear. By this means, as shown in FIG. 6B, the slider 32, with the movable blade 31 attached, comes out of the blade unit 70, and the first protrusions 324 become visible, so that, after the movable blade 31 and the slider 32 are put to a stop, the movable blade 31 can be attached to or removed from the slider 32.

As shown in FIGS. 7A and 7B, the frame 33 is provided with projection parts 331 to be inserted into the guide parts 326. When the gear 36 is rotated to move the movable blade 31 and the slider 32, the guide parts 326 can allow the movable blade 31 and the slider 32 to move smoothly in the Y direction, and, furthermore, limit the range of their movement. Furthermore, by mounting the metal fitting 34 on the +Z side of the slider 32, it is possible to prevent the movable blade 31 and the slider 32 from coming off the frame 33.

When attaching the movable blade 31 to the slider 32, as shown in FIG. 8A, the movable blade 31 is arranged slightly on the −Y side of the slider 32 so as to make the +Z surface of the movable blade 31 and the −Z surface of the slider 32 face each other. In this state, as shown in FIG. 8B, the first protrusions 324 are pushed by the +Z surface of the movable blade 31, and the flexible parts 323 flex towards the +Z side.

Subsequently, the movable blade 31 is moved in the +Y direction. When the first openings 312 reach the position where the first openings 312 and the first protrusions 324 overlap in plan view, as shown in FIG. 8D, the flexible parts 323 flex back, and each first opening 312 enters the first protrusion 324. As a result of this, the movable blade 31 is fixed to the slider 32.

Since the second inclined parts 324*a* are inclined by an angle θ2 so as to make +Y side higher, compared to the case without an inclination, the movable blade 31 can move in the +Y direction with ease, and the first openings 312 can enter the first protrusions 324 with ease. Furthermore, the movable blade 31 attached to the slider 32 can be fixed reliably.

After the movable blade 31 is moved in the +Y direction and the first openings 312 reach the position where the first openings 312 and the first protrusions 324 overlap in plan view, the first protrusions 324 are inserted into the first openings 312. As a result of this, the movable blade 31 can be positioned in the X direction and in the Y direction, with ease, with respect to the slider 32, that is, in the in-plane direction of the movable blade 31.

The movable blade 31 is moved in the +Y direction, and part of the movable blade 31 is accommodated in the accommodating parts 325. By doing so, the −Z surface of the movable blade 31 is abutted against the abutting surfaces 327, so that the movable blade 31 can be positioned in the Z direction as well, with ease, with respect to the slider 32, that is, in the out-of-plane direction of the movable blade 31.

By inserting the first protrusions 324 into the first openings 312, the movable blade 31 is positioned in the XY plane, with respect to the slider 32. Furthermore, by inserting the second protrusions 321 into the second openings 311, the second protrusions 321 are allowed to serve as stoppers, so that, when the movable blade 31 moves and cuts paper, the movable blade 31 does not drift by being pushed by the paper. Furthermore, by accommodating part of the movable blade 31 in the accommodating parts 325, the movable blade 31 is positioned in the Z direction with respect to the slider 32. In this way, the positioning function per direction and the stopper function are shared by each structure.

With the present embodiment, the first opening 312 on the +X side is a long hole whose longitudinal direction is aligned with the X direction. This is to avoid the case where two first openings 312 are made openings of the same circular shape and where the two first protrusions 324 cannot be inserted in the respective first openings 312 smoothly due to a manufacturing error or the like. However, it is not necessary to make one of the first openings 312 a long hole, and both may be formed in a substantially circular shape or the like.

When removing the movable blade 31 from the slider 32, as shown in FIG. 9A and FIG. 9B, pushing the first protrusions 324 engaged with the first openings 312 towards the +Z side makes the flexible parts 323 flex in the direction pushed, and the first protrusions 324 slip out of the first openings 312. This sets the movable blade 31 ready for removal from the slider 32. In this state, by pulling the second protrusions 321 out of the second openings 311 and moving the movable blade 31 towards the −Y side, the movable blade 31 can be removed from the slider 32, as shown in FIG. 9C.

The first inclined part 321*a* is inclined by angle θ1, which makes the −Y side higher, so that, compared to the case without an inclination, the movable blade 31 can move in the −Y direction with ease, and the second protrusions 321 can be pulled out of the second openings 311 more easily. In addition, the movable blade 31 attached to the slider 32 can be fixed reliably.

When the cover is closed, the movable blade 31 is pushed against the slider 32 side by the spring 42 that pushes the fixed blade 41 upward. Therefore, even if the movable blade 31 moves and exits from the blade unit, the second openings 311 do not come off the second protrusions 321, nor do the first openings 312 come off the first protrusions 324. Therefore, even when the recording paper P is cut by the movable blade 31 and the fixed blade 41, the movable blade 31 does not come off.

As described above, according to the present embodiment, a slider 32 includes contact parts 329 that are in contact with a movable blade 31, flexible parts 323 that are formed thinner than the contact parts 329, and first protrusions 324 that are provided on the flexible parts 323. The movable blade 31 has first openings 312, and first openings 312 of the movable blade 31 engage with the first protrusions 324.

This structure makes it possible to fix the movable blade 31 to the slider 32 reliably, and to form the first protrusions 324 easy to engage with the first openings 312. Compared to the method of mounting the movable blade on the slider by applying pressure to openings and fitting them into protrusions, or the method of fixing the movable blade and slider to a frame, the movable blade 31 can be attached to the slider 32 with ease. Furthermore, the movable blade 31 can be removed from the slider 32 with ease. Therefore, the user can replace the movable blade and/or the like by himself/herself.

Furthermore, the printer 1 includes a main body 50, and a cover 60 that is joined with the main body 50 such that the cover 60 can be opened and closed. A fixed blade 41 is set in the main body 50, and a blade unit 70 is set in the cover 60. Then, with the cover 60 open, the movable blade 31 can be attached to and removed from a slider 32 with ease.

Furthermore, the slider 32 is provided with flexible parts 323, and the flexible parts 323 are provided with first protrusions 324. When the movable blade 31 is attached to and removed from the slider 32, the first protrusions 324 are pushed, and the flexible parts 323 flex partly.

If the whole slider is configured to flex when the movable blade is attached to and removed from the slider, the movable blade also flexes following the flex of the slider, and stress might be applied to the movable blade. However, by allowing the slider to flex partly in the flexible parts 323, it is possible to prevent such stress from being produced. In particular, when the movable blade is curved slightly for improved cutting performance, there is a concern that the way the movable blade is curved might change due to stress, so that the advantage of providing the flexible parts 323 becomes more obvious.

Furthermore, with the blade unit 70, too, the same advantage as with the above-described printer can be achieved.

Although an embodiment of the present invention has been described above, the above contents by no means limit the scope of the present invention.

What is claimed is:

1. A blade unit to be attached to a printer, the blade unit including a fixed blade and a movable blade to cut recording paper, the blade unit comprising:

a slider having an attachment/removal mechanism configured to fix the movable blade so that the movable blade can be attached to or removed from the slider, the attachment/removal mechanism including a through-hole, a beam hung over the through-hole and a first protrusion provided on the beam;

wherein the movable blade is attachable with the slider by engaging the first protrusion with a first opening provided in the movable blade.

2. The blade unit according to claim 1, wherein the slider has a plurality of the attachment/removal mechanism.

3. The blade unit according to claim 1, wherein the slider further includes a second protrusion provided further outward than the attachment/removal mechanism, wherein the movable blade further includes a second opening configured to engage with the second protrusion.

4. The blade unit according to claim 3, wherein the second protrusion configured to have a first inclined part so that one side of the second protrusion is higher than other side of the second protrusion, wherein the first protrusion configured to have a second inclined part so that one side of the first protrusion is higher than other side of the first protrusion.

5. The blade unit according to claim 1, wherein the slider further includes an accommodating part in the outer periphery of the through-hole, configured so that part of the movable blade attached to the slider can be accommodated, the accommodating part is in a box shape, and wall parts of the accommodating part are partially open.

6. The blade unit according to claim 1, further includes a frame configured to attach the slider;

the frame has a projection part, the slider further includes a guide part having a long hole, wherein the move of the movable blade and the slider with respect to the frame can be guided by inserting the projection part into the guide part.

7. A blade unit to be attached to a printer, the blade unit including a fixed blade and a movable blade to cut recording paper, the blade unit comprising:

a slider having an attachment/removal mechanism configured to fix the movable blade so that the movable blade can be attached to or removed from the slider, the attachment/removal mechanism including a recess part that is thinner in thickness than other parts of the slider, and a first protrusion provided on a bottom surface of the recess part;

wherein the movable blade includes a first opening on a surface of the movable blade and is attachable to a blade mounting surface of the slider by engaging the first protrusion with the first opening, the blade mounting surface being distinct from a surface of the recess part and configured to contact the surface of the movable blade.

* * * * *